US012734652B2

(12) United States Patent
Lin

(10) Patent No.: US 12,734,652 B2
(45) Date of Patent: Sep. 15, 2026

(54) HAND TOOL WITH ROTARY HANDLE

(71) Applicant: YIH CHENG FACTORY CO., LTD., Nantuo (TW)

(72) Inventor: Jack Lin, Nantuo (TW)

(73) Assignee: YIH CHENG FACTORY CO., LTD., Nantuo (TW)

( * ) Notice: Subject to any disclaimer, the term of this patent is extended or adjusted under 35 U.S.C. 154(b) by 586 days.

(21) Appl. No.: 18/218,991

(22) Filed: Jul. 6, 2023

(65) Prior Publication Data

US 2025/0010437 A1 Jan. 9, 2025

(51) Int. Cl.

| | |
|---|---|
| ***B25B 23/00*** | (2006.01) |
| ***B25B 23/16*** | (2006.01) |
| ***B25F 5/00*** | (2006.01) |
| ***B25F 5/02*** | (2006.01) |
| ***B25G 1/00*** | (2006.01) |
| ***B25G 1/06*** | (2006.01) |
| ***B25G 1/08*** | (2006.01) |

(52) U.S. Cl.

CPC .......... *B25B 23/0028* (2013.01); *B25B 23/16* (2013.01); *B25G 1/066* (2013.01); *B25G 1/085* (2013.01); *B25F 5/02* (2013.01); *Y10T 403/32278* (2015.01); *Y10T 403/32942* (2015.01)

(58) Field of Classification Search

CPC .......... B25G 1/066; B25G 1/085; B25G 3/18; B25B 23/0028; B25B 23/16; B25B 23/0035; Y10T 403/32942; Y10T 403/32278; B25F 5/02; B60J 1/2063

USPC ....... 403/160, 86; 81/177.4; 160/263, 323.1, 160/903; 248/270

See application file for complete search history.

(56) References Cited

U.S. PATENT DOCUMENTS

| | | | | |
|---|---|---|---|---|
| 7,347,127 | B2 * | 3/2008 | Hu | B25G 1/066 81/177.85 |
| 8,826,782 | B2 * | 9/2014 | Chen | B25G 1/085 81/177.4 |
| 8,881,624 | B2 * | 11/2014 | Huang | B25G 1/066 81/177.8 |
| 9,539,006 | B2 * | 1/2017 | Collings | A61B 17/068 |
| D1,021,238 | S * | 4/2024 | Van Alphen | D28/18 |
| 2007/0107563 | A1 * | 5/2007 | Hu | B25G 1/066 81/177.1 |
| 2007/0272060 | A1 * | 11/2007 | Schoenbeck | B25G 1/066 81/177.8 |

(Continued)

*Primary Examiner* — Mahdi H Nejad

(74) *Attorney, Agent, or Firm* — HDLS IPR SERVICES; Chun-Ming Shih

(57) ABSTRACT

A hand tool includes a first handle, a second handle, a rotating locking set and a button set. The first and second handles include oblique faces respectively. The rotating locking set includes an annular seat arranged in the first handle, a locking barrel passing the annular seat and rotatable relative to the annular seat, and a locking block. The locking barrel includes an insertion hole and at least one locking groove communicating with each other. One end of the locking block is fixed on the second handle, and the other end of the locking block is combined with the locking barrel. The button set is disposed on the first handle and includes a button exposed from the first handle, a locking lever, and a spring. The locking lever is connected with the button and extends into the insertion hole. The spring is arranged in the first handle.

10 Claims, 10 Drawing Sheets

(56) References Cited

U.S. PATENT DOCUMENTS

| | | | | | |
|---|---|---|---|---|---|
| 2008/0121074 | A1* | 5/2008 | Hu | B25G 1/066 | 81/177.8 |
| 2008/0163990 | A1* | 7/2008 | Hammond | B60J 1/2063 | 160/323.1 |
| 2011/0266014 | A1* | 11/2011 | McRoberts | B25F 5/02 | 173/170 |
| 2012/0048071 | A1* | 3/2012 | Huang | B25G 1/066 | 81/177.8 |
| 2012/0160529 | A1* | 6/2012 | Eshleman | B25F 5/00 | 173/1 |
| 2023/0364773 | A1* | 11/2023 | Lin | B25G 1/066 | |

* cited by examiner

HAND TOOL WITH ROTARY HANDLE

TECHNICAL FIELD

The technical field relates to a hand tool, and more particularly relates to a hand tool with a rotary handle.

DESCRIPTION OF RELATED ART

Generally, hand tools are mostly used with a fixed direction, for example, a flat-blade screwdriver or a right angle ratcheting screwdriver (90 degrees), etc. The fixed angle hand tool is applied in a specific direction. However, when the hand tool needs to change the direction in use or is applied in a constrained space, then the hand tool being used has to be replaced, and that results in inconvenience.

Furthermore, there are a hand tool with a rotary handle on the market. The hand tool includes a spring and two handles, and the handles rotate relatively and are positioned through the pressing or the elastic restoring force of the spring. Additionally, when using such a hand tool with a rotary handle, users need to pull one of the handles away from the other to rotate. However, the above rotation needs a certain distance for the relative rotation operated between the handles. Thus, there is a restriction of space in using the hand tool with a rotary handle of the related art.

In view of the above drawbacks, the inventor proposes this disclosure based on his expert knowledge and elaborate researches in order to solve the problems of related art.

SUMMARY OF THE DISCLOSURE

One object of this disclosure is to provide a hand tool with a rotary handle, which the button may be pressed to drive the locking lever to move and release the blocking of the locking barrel, so that the second handle may rotate relative to the first handle and is positioned at a specific angle to increase the convenience of use.

In the embodiment of this disclosure, a hand tool includes a first handle, a second handle, a rotating locking set and a button set. The first handle includes a first oblique face. The second handle is combined with the first handle and includes a second oblique face correspondingly attached to the first oblique face. The rotating locking set includes an annular seat, a locking barrel, and a locking block. The annular seat is arranged in the first handle. The locking barrel passes through the annular seat and is capable of rotating relative to the annular seat. The locking barrel includes an insertion hole and at least one locking groove communicating with each other. One end of the locking block is fixed on the second handle, and the other end of the locking block is combined with the locking barrel. The button set is disposed on the first handle and includes a button, a locking lever, and a spring. The button is exposed from the first handle. The locking lever is connected with the button and extends into the insertion hole. The spring is arranged in the first handle and elastically abuts against the locking lever. The locking lever is elastically pushed by the spring to move from the insertion hole into the at least one locking groove to restrict a rotation of the locking barrel. The button presses the spring under an external force and drives the locking lever to move out of the at least one locking groove, so that the locking barrel may rotate relative to the annular seat, and an angle of the first handle relative to the second handle is changed through a rotation of the locking barrel.

In comparison with the related art, the hand tool of this disclosure is provided with oblique faces on the first and second handles respectively, and the rotating locking set is disposed between the first and second handles. Furthermore, the annular seat and the locking barrel of the rotating locking set are disposed on the first handle, and the locking block is disposed in the second handle. Moreover, the hand tool of this disclosure drives the locking lever to move by pressing the button to release the blocking from the locking barrel, so that the locking barrel may rotate relative to the annular seat. Therefore, the second handle may rotate relative to the first handle and is positioned at a specific angle to increase the convenience of use.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
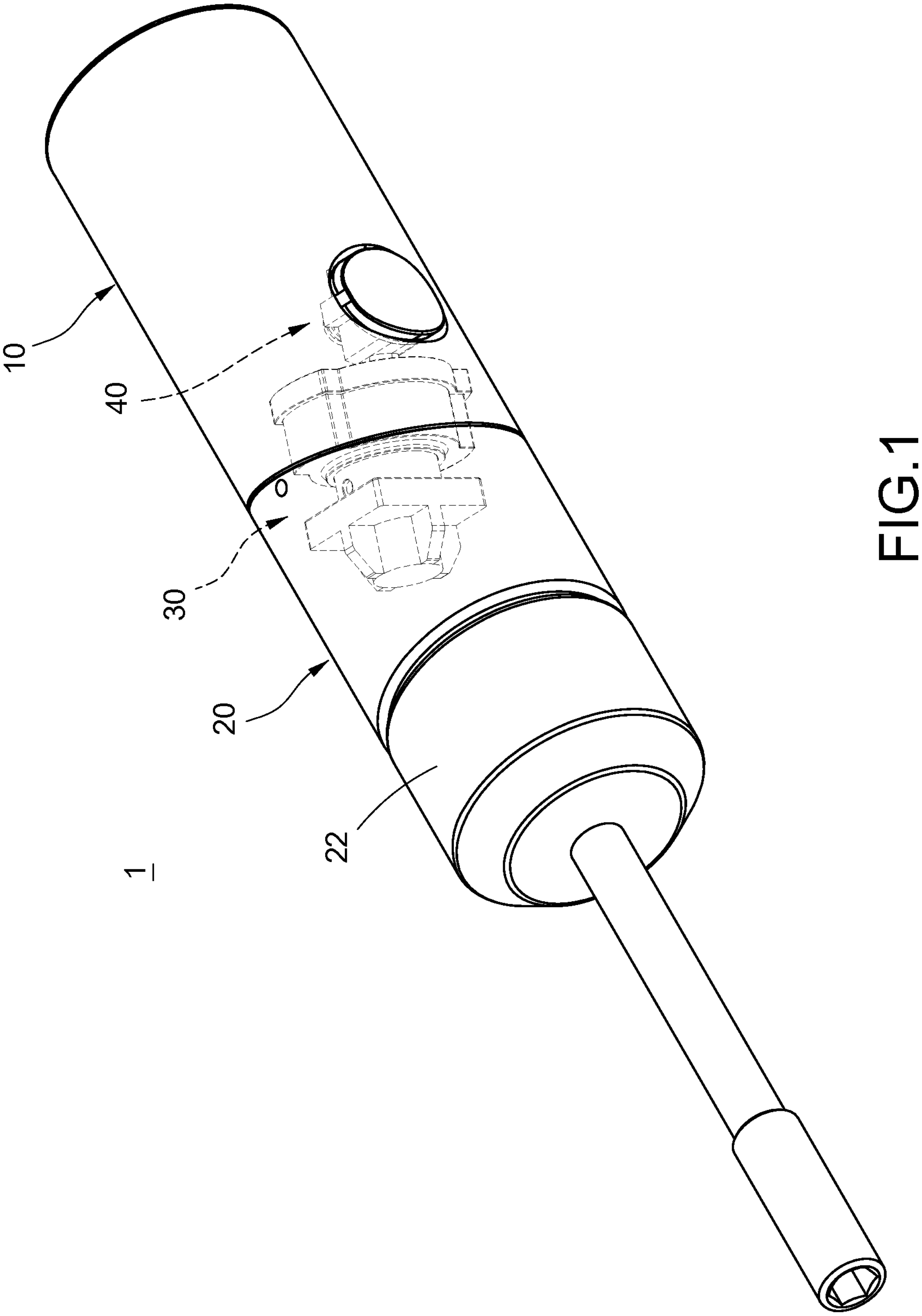
FIG. 1 is a perspective schematic view of the hand tool with a rotary handle in this disclosure.
Figure 2:
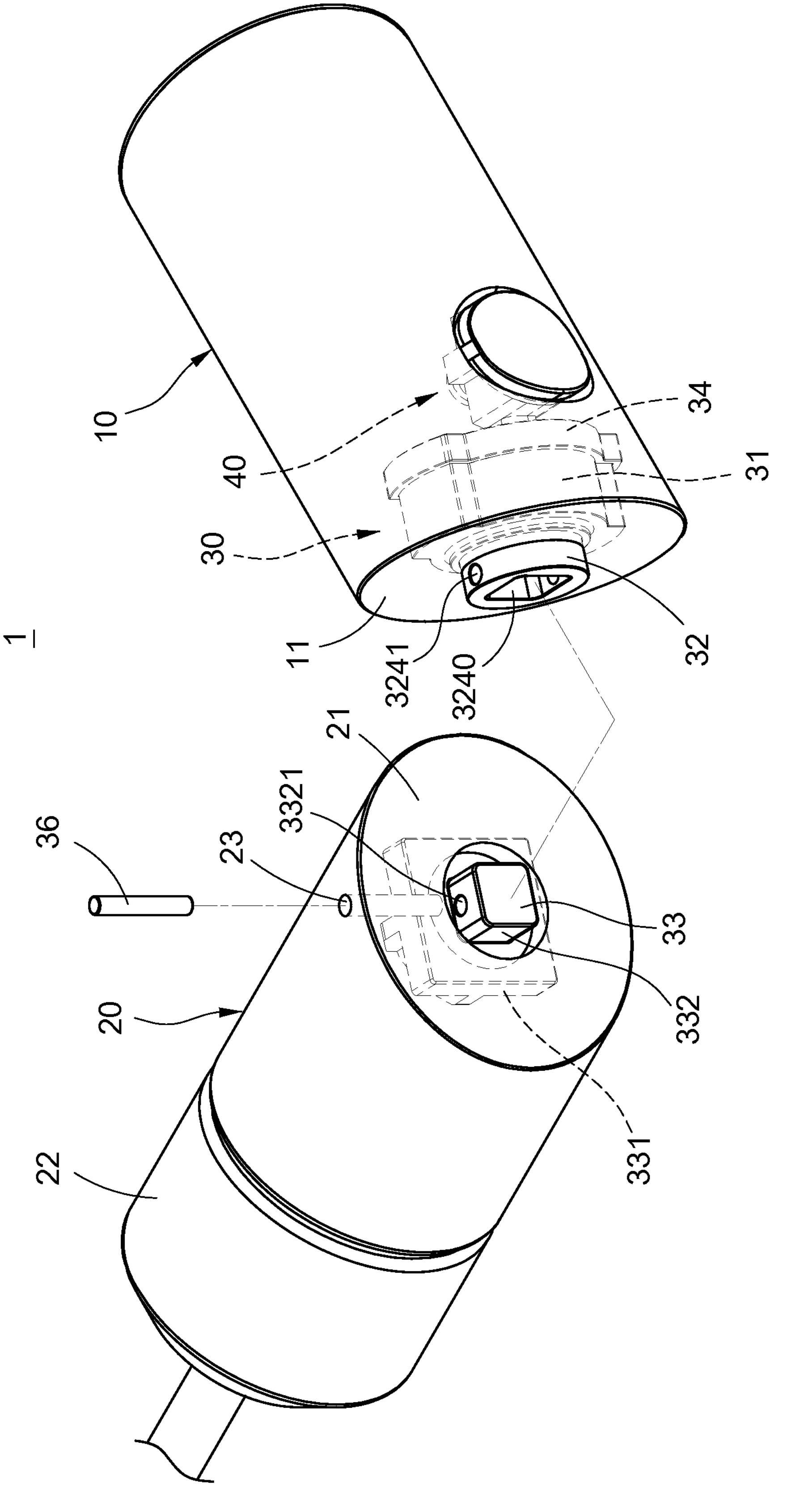
FIG. 2 is a combination schematic view of the handles of the hand tool with a rotary handle in this disclosure.
Figure 3:
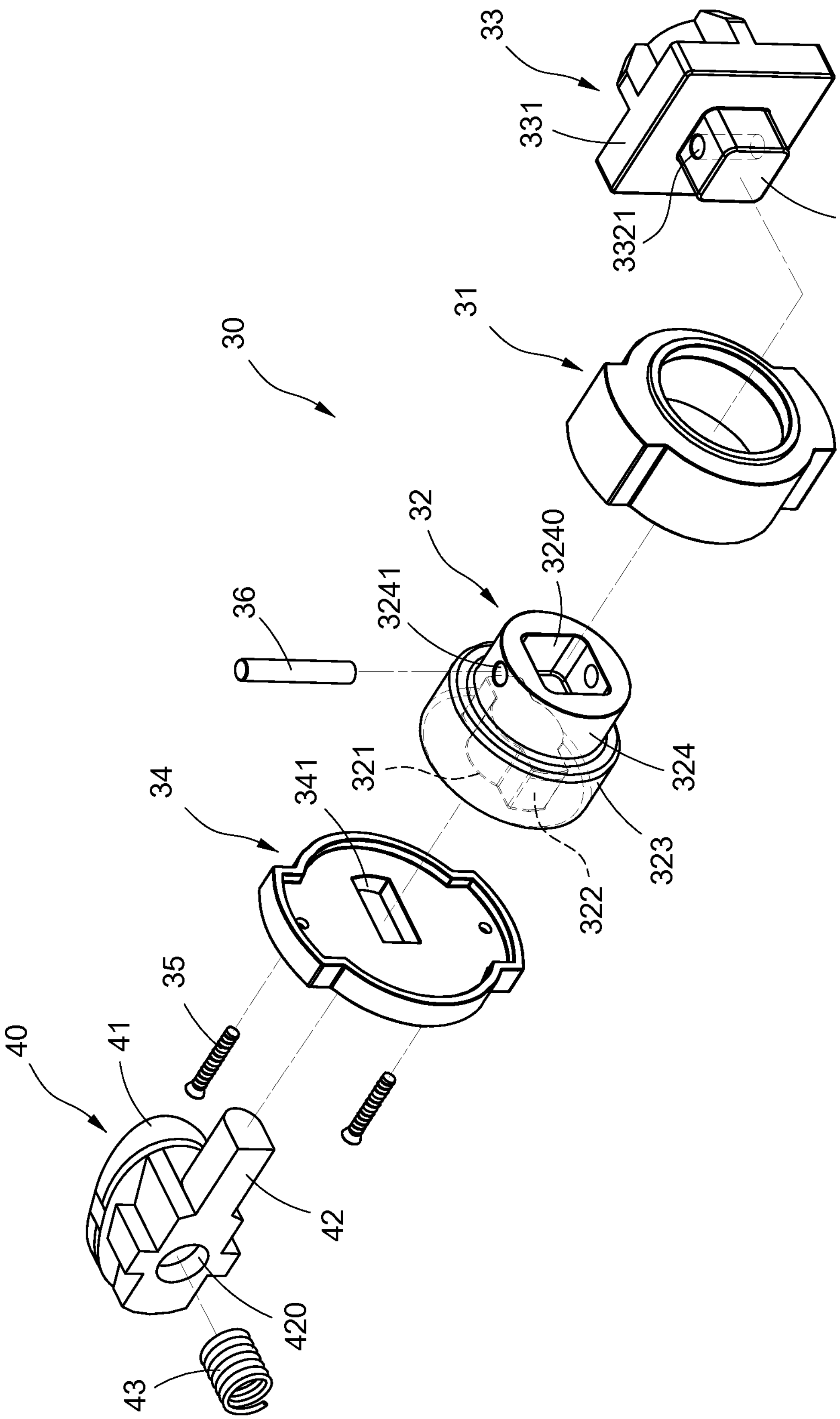
FIG. 3 is a perspective exploded schematic view of the rotating engaging set and the button set of the hand tool with a rotary handle in this disclosure.

Please refer to FIG. 1 to FIG. 3, which depict a perspective schematic view of the hand tool with a rotary handle in this disclosure, a combination schematic view of the handles of the hand tool with a rotary handle in this disclosure, and a perspective exploded schematic view of the rotating engaging set and the button set of the hand tool with a rotary handle in this disclosure. This disclosure is a hand tool 1 with a rotary handle including a first handle 10, a second handle 20, a rotating locking set 30 and a button set 40. The rotating locking set 30 is disposed between the first handle 10 and the second handle 20. The button set 40 is disposed on the first handle 10. Additionally, the first handle 10 and the second handle 20 may rotate relatively to be positioned with each other through the rotating locking set 30. Therefore, the angle of the second handle 20 relative to the first handle 10 may be changed.

The first handle 10 includes a first oblique face 11. Additionally, the second handle 20 is combined with the first handle 10, and the second handle 20 includes a second oblique face 21 correspondingly attached to the first oblique face 11.

Specifically, the first oblique face 11 and the second oblique face 21 are of an elliptical shape respectively. Moreover, the second handle 20 is provided with a tool head 22 opposite the second oblique face 21.

The rotating locking set 30 includes an annular seat 31, a locking barrel 32 and a locking block 33. The annular seat 31 is arranged in the first handle 10. The locking barrel 32 passes through the annular seat 31 and is capable of rotating relative to the annular seat 31. Furthermore, the locking barrel 32 includes an insertion hole 321 and at least one locking groove 322 communicating with each other. In this embodiment, a pair of locking groove 322 are disposed on two sides of the insertion hole 321 opposite to each other. Additionally, one end of the locking block 33 is fixed on the second handle 20, and the other end of the locking block 33 is combined with the locking barrel 32.

In more detail, the locking barrel 32 includes a cylinder 323 and a column 324 connected to the cylinder 323. The cylinder 323 includes the insertion hole 321 and the at least one locking groove 322. It should be noted that the locking barrel 32 is inserted in the annular seat 31, and one end of the column 324 of the locking barrel 32 protrudes from the first oblique face 11. Moreover, the column 324 includes an opening 3240 and is combined with one end of the locking block 33.

Furthermore, the locking block 33 includes a base 331 and a protrusion 332 connected to the base 331. The protrusion 332 is inserted in the opening 3240 of the column 324.

Moreover, the button set 40 is disposed on the first handle 10. The button set 40 includes a button 41, a locking lever 42 and a spring 43. The button 41 is exposed from the first handle 10. The locking lever 42 is connected with the button 41 and extends into the insertion hole 321 of the locking barrel 32. Furthermore, the spring 43 is arranged in the first handle 10. The locking lever 42 is elastically pushed by the spring 43 to move from the insertion hole 321 into the locking groove 322 to restrict the rotation of the locking barrel 32.

In this embodiment, a cavity 420 is defined on a side of the locking lever 42 facing the spring 43. Additionally, one end of the spring 43 is accommodated in the cavity 420 (that is, one end of the spring 43 abuts against the inner surface of the cavity 420), and the other end of the spring 43 abuts against the inner wall of the first handle 10. Thus, the spring 43 elastically abuts against the locking lever 42.

In this embodiment, the rotating locking set 30 further includes a locking plate 34 and a plurality of locking pieces 35. The locking plate 34 is fastened on one side of the annular seat 31 through the locking pieces 35. Specifically, an outline of the locking plate 34 is designed corresponding to that of the annular seat 31, and a slot 341 is disposed on the locking plate 34. The locking lever 42 passes through the slot 341 and the annular seat 31 to extend into the insertion hole 321 of the locking barrel 32. It should be noted that the annular seat 31 and the locking plate 34 are placed in the first handle 10 and are nonrotatable.

In one embodiment of this disclosure, the rotating locking set 30 further includes a first pin 36. The locking barrel 32 and the locking block 33 are combined with each other through the first pin 36 passing through the column 324 and the protrusion 332.

Specifically, the second handle 20 has a pin hole 23. The column 324 has a first perforation 3241 communicating with the opening 3240, and a through hole 3321 is disposed on the protrusion 332. Additionally, the first pin 36 passes through the pin hole 23, the first perforation 3241 and the through hole 3321 to fix the locking block 33 and the locking barrel 32.

Figure 4:
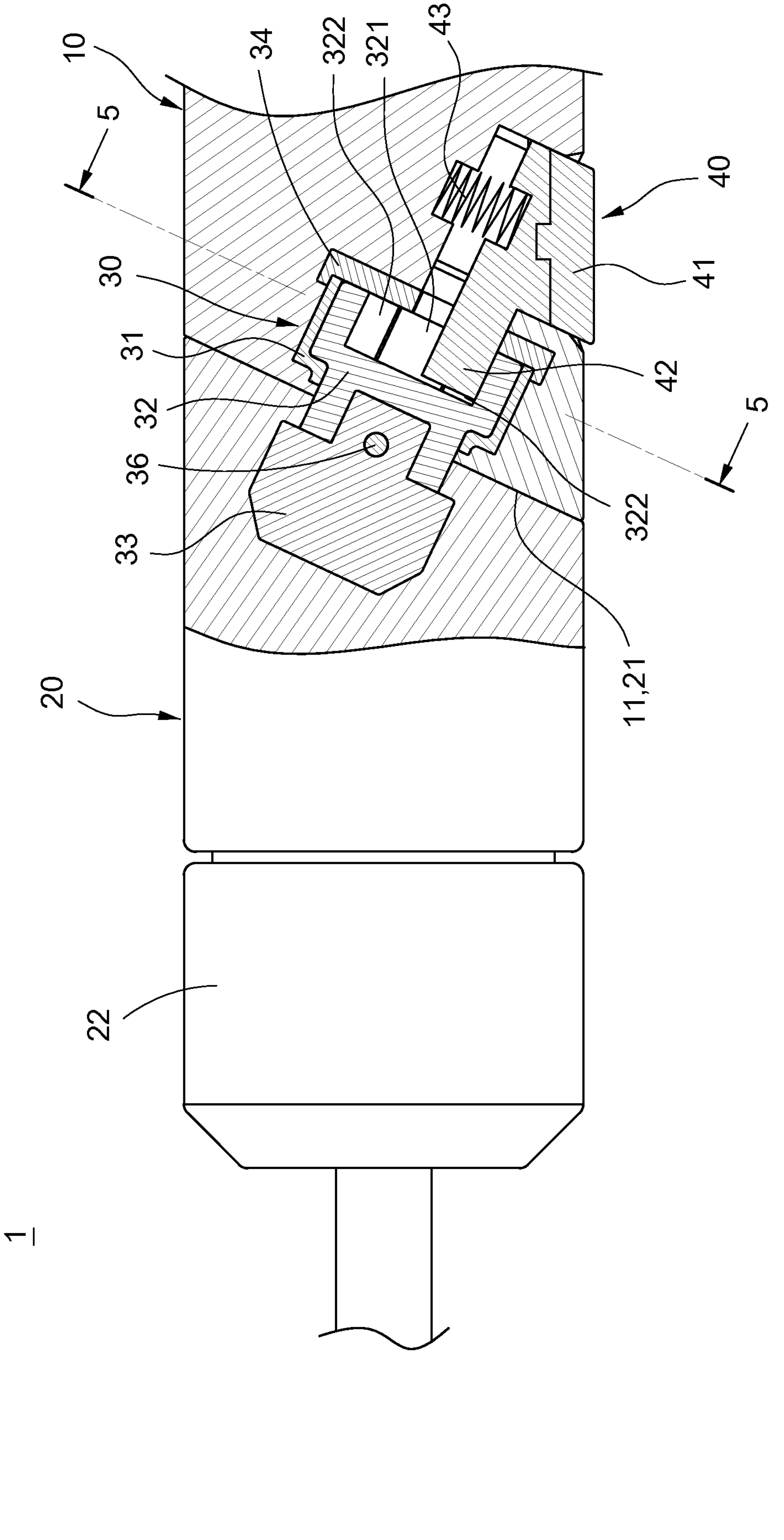
FIG. 4 and FIG. 5 are cross sectional views from two sides of the combination of the hand tool in this disclosure.
Figure 5:
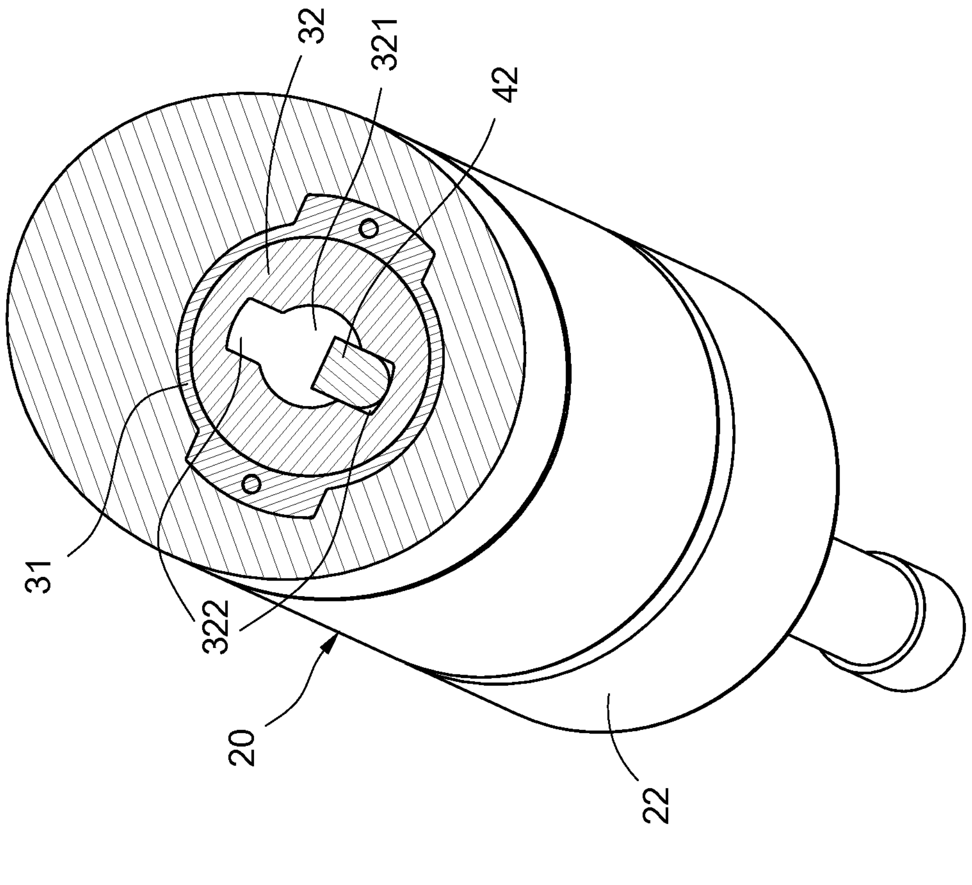

Please further refer to FIG. 4 and FIG. 5, which are cross sectional views from two sides of the combination of the hand tool in this disclosure. The first handle 10 and the second handle 20 of this disclosure relatively rotate to be positioned with each other through the rotating locking set 30 to change the angle of the second handle 20 relative to the first handle 10. The annular seat 31, the locking barrel 32 and the locking plate 34 of the rotating locking set 30 are disposed in the first handle 10. The locking block 33 is disposed in the second handle 20.

Specifically, the button set 40 is disposed on the first handle 10. When the button 41 of the button set 40 is not pressed, the locking lever 42 is elastically pushed by the spring 43 to move into the locking groove 322 of the locking barrel 32. The locking barrel 32 is blocked by the locking lever 42 and may not rotate relative to the annular seat 31. Moreover, the locking block 33 is connected with the locking barrel 32, and the locking block 33 is arranged in the second handle 20, so that the second handle 20 may not rotate relative to the first handle 10. The second handle 20 and the first handle 10 are arranged linearly.

Figure 6:
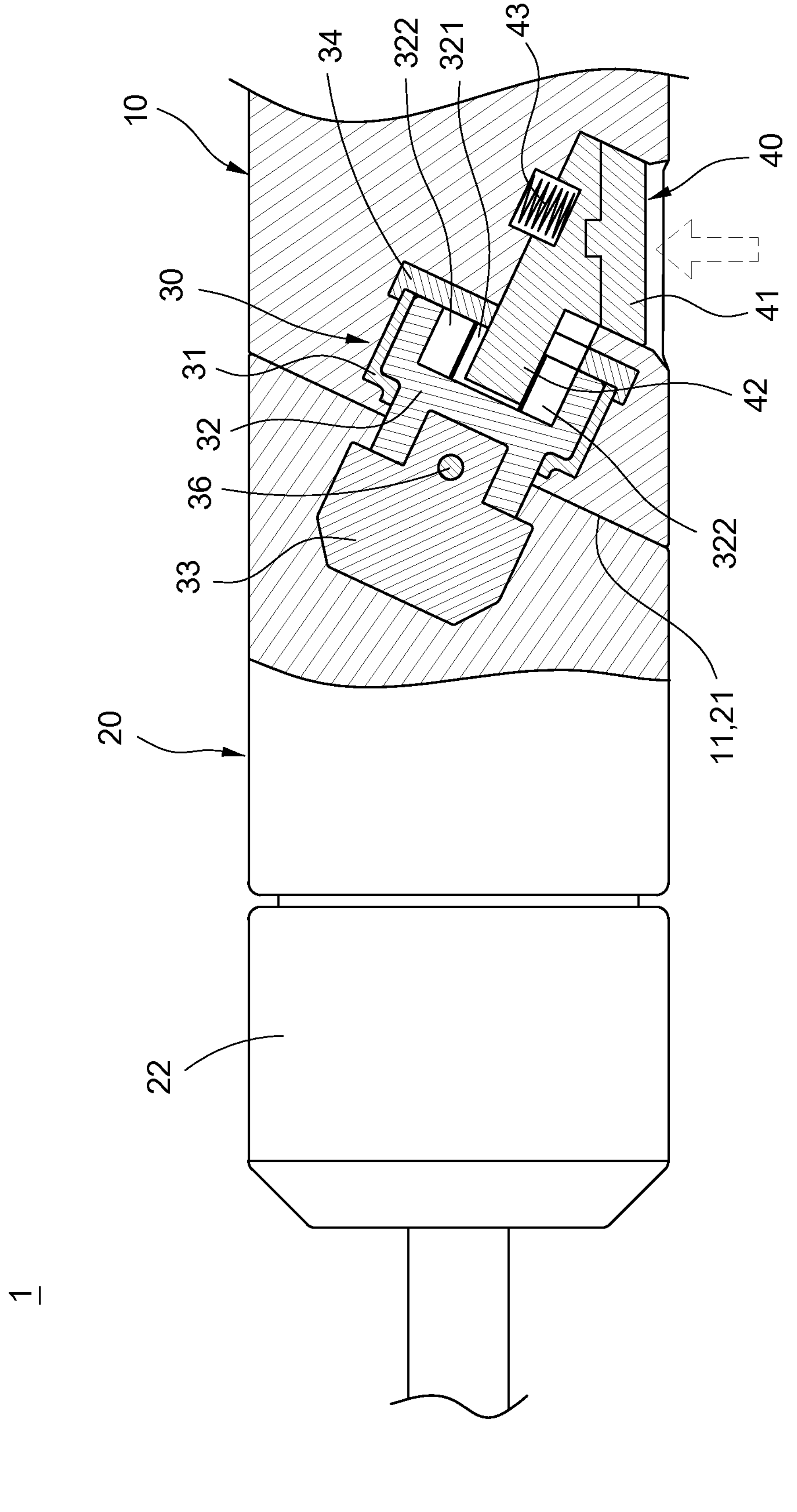
FIG. 6 is an operation schematic view of pressing the button set of the hand tool with a rotary handle in this disclosure.
Figure 7:
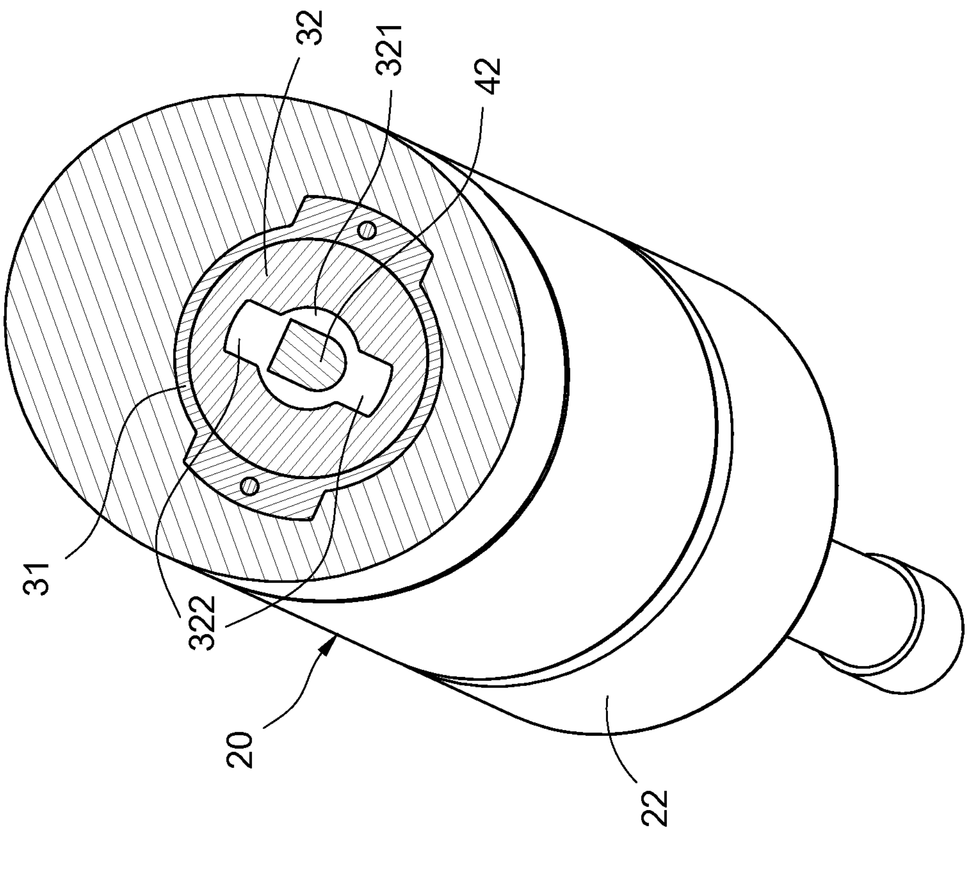
FIG. 7 is a cross sectional view of pressing the button set of the hand tool with a rotary handle in this disclosure.

Please further refer to FIG. 6 and FIG. 7, which depict an operation schematic view and a cross sectional view of pressing the button set of the hand tool with a rotary handle in this disclosure. The hand tool 1 of this disclosure may change the angle of the tool head 22 of the second handle 20 by pressing the button set 40. Further, the button 41 of the button set 40 is pressed to drive the locking lever 42 to leave the locking groove 322 and move toward the insertion hole 321. Then, the locking barrel 32 is released from the blocking of the locking lever 42 and is capable of rotating relative to the annular seat 31. Moreover, since the locking block 33 is connected with the locking barrel 32, and the locking block 33 is arranged in the second handle 20, the second handle 20 may rotate relative to the first handle 10.

In summary, the button 41 of this disclosure presses the spring 43 under an external force and drives the locking lever 42 to move out of the locking groove 322, so that the locking barrel 32 may rotate relative to the annular seat 31. Therefore, the angle of the second handle 20 relative to the first handle 10 is changed by the rotation of the locking barrel 32.

Figure 8:
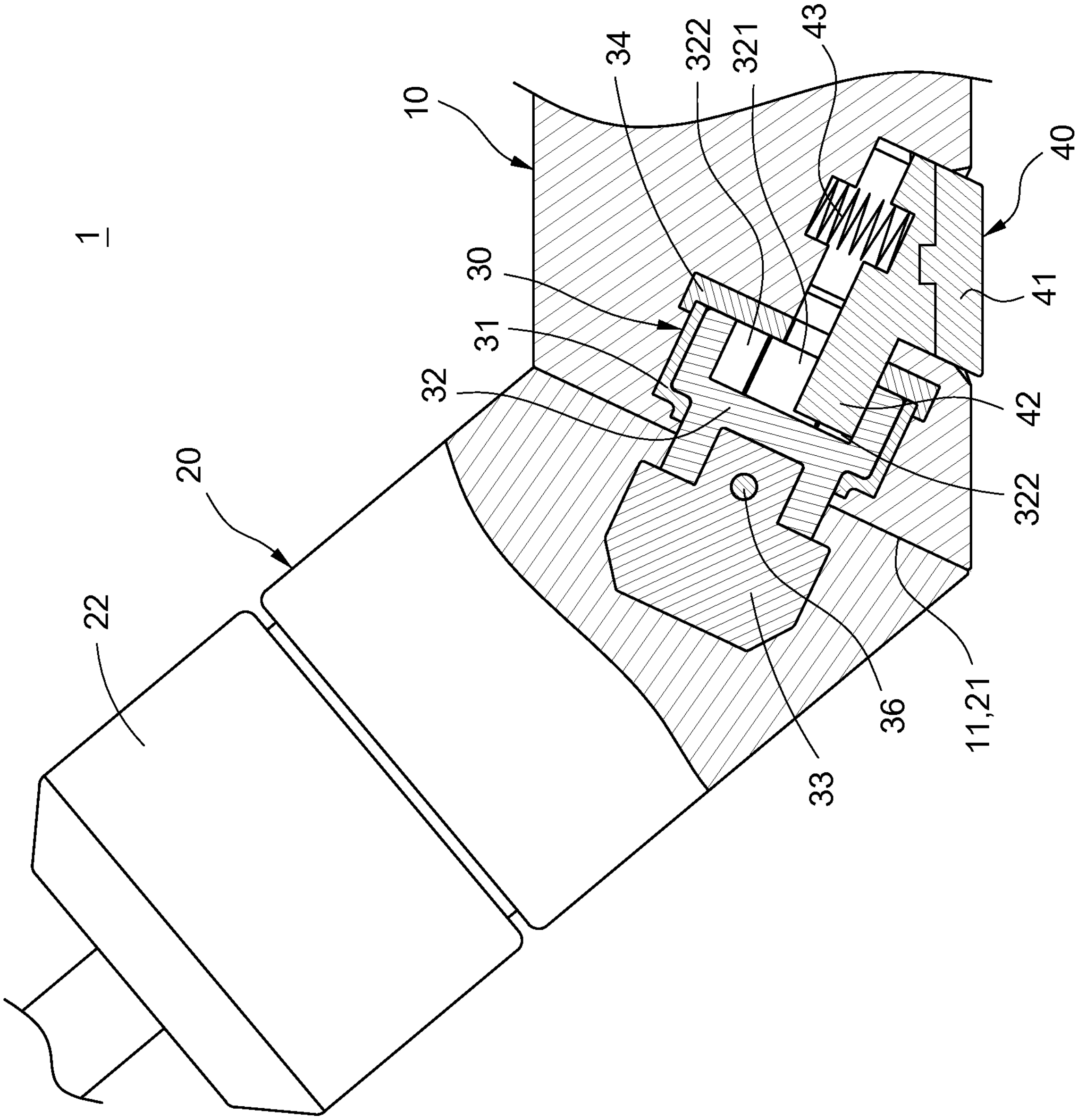
FIG. 8 and FIG. 9 are cross sectional views from two sides of the hand tool after rotation in this disclosure.
Figure 9:
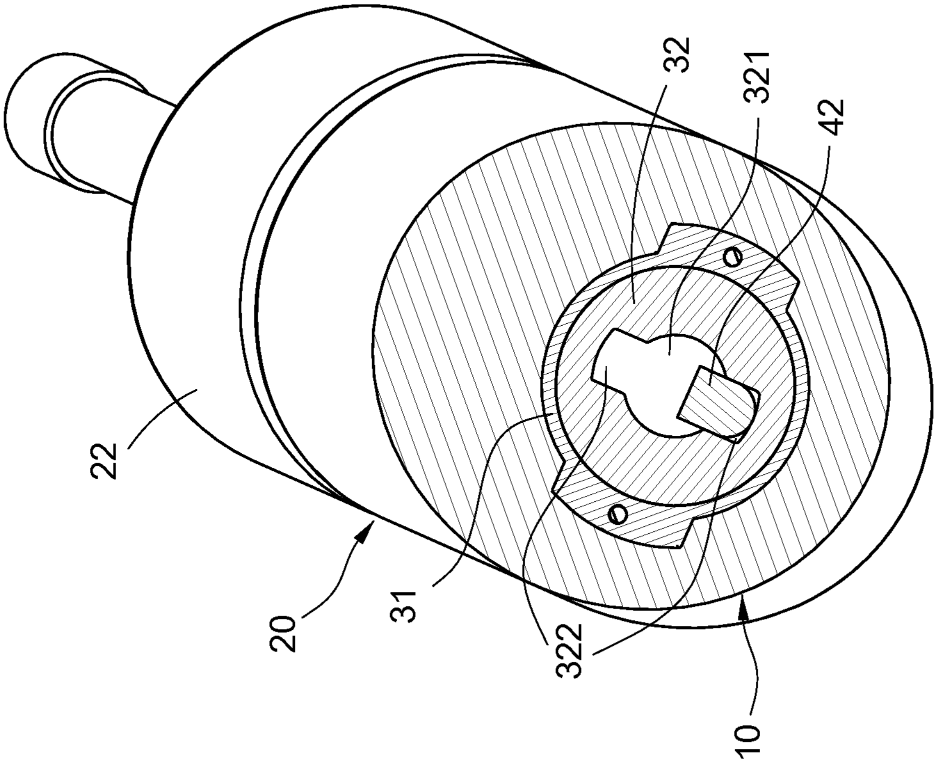
Figure 10:
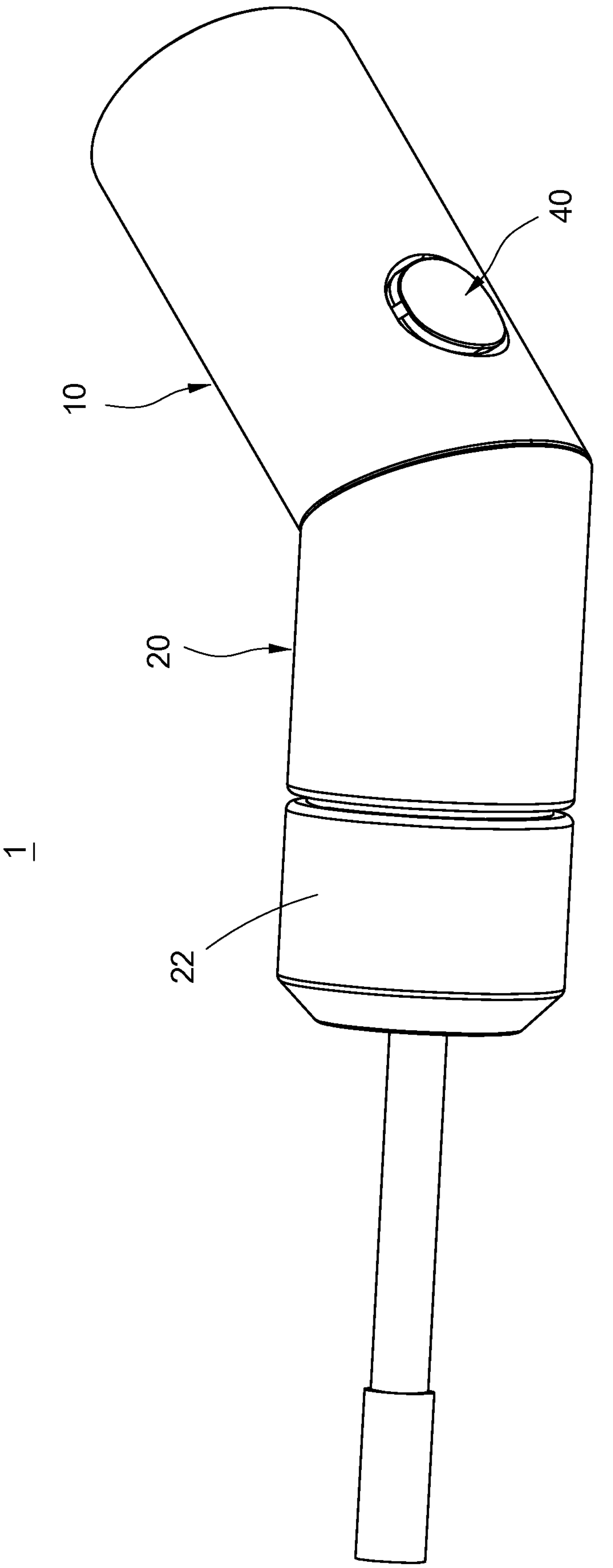
FIG. 10 is a perspective schematic view of the hand tool after rotation in this disclosure.

Please further refer to FIG. 8 to FIG. 10, which depict two cross sectional views and a perspective schematic view of rotating the hand tool with a rotary handle in this disclosure. After the second handle 20 of this disclosure is rotated relative to the first handle 10, then releasing the button 41. The locking lever 42 is pushed by the restoring force of the spring 43 and moves into the locking groove 322 again. The locking barrel 32 is blocked by the locking lever 42 again and may not rotate relative to the annular seat 31. Accordingly, the angle of the second handle 20 relative to the first handle 10 is fixed, and the tool head 22 may work at the specific angle.

It is worth of noticing that a pair of locking grooves 322 are disposed in the hand tool 1 of this embodiment. The second handle 20 may rotate reversely relative to the first handle 10, and the locking lever 42 may move into another locking groove 322. Therefore, the angle of the second handle 20 relative to the first handle 10 may be positioned in another direction to increase the convenience of use.

While this disclosure has been described by means of specific embodiments, numerous modifications and variations could be made thereto by those skilled in the art without departing from the scope and spirit of this disclosure set forth in the claims.

What is claimed is:

1. A hand tool, comprising:

a first handle, comprising a first oblique face;

a second handle, combined with the first handle, and comprising a second oblique face correspondingly attached to the first oblique face;

a rotating locking set, comprising an annular seat, a locking barrel, and a locking block, wherein the annular seat is arranged in the first handle, the locking barrel passes through the annular seat and is rotatable relative to the annular seat; the locking barrel comprises an insertion hole and at least one locking groove communicating with each other, one end of the locking block is fixed on the second handle, and another end of the locking block is combined with the locking barrel; and a button set, disposed on the first handle, and comprising a button, a locking lever, and a spring, wherein the button is exposed from the first handle, the locking lever is connected with the button and extends to the insertion hole, the spring is arranged in the first handle and elastically abuts against the locking lever, and the locking lever is elastically pushed by the spring to move from the insertion hole to the at least one locking groove to restrict a rotation of the locking barrel;

wherein, the button is configured to press the spring under an external force and drive the locking lever to move out of the at least one locking groove to make the locking barrel be rotatable relative to the annular seat, and an angle of the first handle relative to the second handle is changed through the rotation of the locking barrel.

2. The hand tool according to claim 1, wherein the first oblique face and the second oblique face are of an elliptical shape respectively.

3. The hand tool according to claim 1, wherein the rotating locking set further comprises a locking plate and a plurality of locking pieces, and the locking plate is fastened on one side of the annular seat through the locking pieces.

4. The hand tool according to claim 3, wherein an outline of the locking plate is arranged corresponding to an outline of the annular seat; and the locking plate comprises a slot, and the locking lever passes through the slot and the annular seat to extend to the insertion hole.

5. The hand tool according to claim 3, wherein the annular seat and the locking plate are placed in the first handle and are nonrotatable relative to the first handle.

6. The hand tool according to claim 1, wherein the locking barrel comprises a cylinder and a column connected to the cylinder;

the cylinder comprises the insertion hole and the at least one locking groove; and the column comprises an opening and is combined with the one end of the locking block.

7. The hand tool according to claim 6, wherein the locking block comprises a base and a protrusion connected to the base, and the protrusion is inserted in the opening.

8. The hand tool according to claim 7, wherein the rotating locking set further comprises a first pin, and the locking barrel and the locking block are combined with each other by the first pin passing through the column and the protrusion.

9. The hand tool according to claim 8, wherein the second handle comprises a pin hole, the column comprises a first perforation communicating with the opening, and the protrusion comprises a through hole; and the first pin passes through the pin hole, the first perforation and the through hole to fix the locking block and the locking barrel.

10. The hand tool according to claim 1, wherein a cavity is defined on a side of the locking lever facing the spring, and one end of the spring is accommodated in the cavity.

* * * * *